US006533479B2

(12) United States Patent
Kochanski

(10) Patent No.: US 6,533,479 B2
(45) Date of Patent: Mar. 18, 2003

(54) INTEGRAL KEYBOARD/TRAY/WRIST REST

(75) Inventor: Walter T. Kochanski, Fort Wayne, IN (US)

(73) Assignee: Pent Products, Kendallville, IN (US)

( * ) Notice: Subject to any disclaimer, the term of this patent is extended or adjusted under 35 U.S.C. 154(b) by 0 days.

(21) Appl. No.: 09/746,292

(22) Filed: Dec. 21, 2000

(65) Prior Publication Data

US 2002/0079410 A1 Jun. 27, 2002

(51) Int. Cl.[7] .......................... G06F 3/02; G06F 3/033

(52) U.S. Cl. .................... 400/715; 400/472; 312/223.3

(58) Field of Search ............................ 400/715, 472; 312/223.3

(56) References Cited

U.S. PATENT DOCUMENTS 4,844,388 A * 7/1989 Kuba et al. .................. 108/5
5,158,257 A 10/1992 Wilson ...................... 248/346
5,197,699 A 3/1993 Smith et al. ............... 248/118
5,260,884 A * 11/1993 Stern ........................ 361/680
5,390,764 A * 2/1995 Kerber ...................... 186/68
5,509,628 A 4/1996 Noble ....................... 248/118
5,628,483 A 5/1997 Smith et al. ............... 248/118
5,655,743 A 8/1997 Gillis ..................... 248/346.01
D387,744 S 12/1997 Kirchhoff et al. .......... D14/114
D396,708 S 8/1998 Kirchhoff et al. .......... D14/114
5,961,231 A * 10/1999 Ambrose .................... 400/472
5,995,082 A * 11/1999 Lakoski ...................... 248/918
6,035,214 A * 3/2000 Henderson .................. 345/905
6,045,098 A 4/2000 Timm ......................... 248/118
6,059,470 A * 5/2000 Myint ........................ 400/488

* cited by examiner

*Primary Examiner*—Daniel J. Colilla
(74) *Attorney, Agent, or Firm*—Taylor & Aust, P.C.

(57) ABSTRACT

A keyboard assembly includes an integral keyboard device having a keyboard pad support, a keyboard pad, and a wrist rest. An attachment assembly attaches the integral keyboard device to a work surface.

17 Claims, 2 Drawing Sheets

INTEGRAL KEYBOARD/TRAY/WRIST REST

BACKGROUND OF THE INVENTION

1. Field of the Invention

The present invention relates to a computer workstation, and, more particularly, to a keyboard support for a computer workstation.

2. Description of the Related Art

A computer workstation often includes a keyboard tray for supporting a computer keyboard. The keyboard, mouse pad and mouse are supported by and are freely slidable across the upper surface of the keyboard tray. A problem is that the positions of the keyboard and mouse pad must be frequently adjusted by the user in order to compensate for the sliding of the keyboard and mouse pad on the upper surface of the keyboard tray. Another problem is that the cords leading from the keyboard and mouse often become undesirably placed as the keyboard and mouse slide across the keyboard tray. This may lead to the cords being snagged, thereby pulling the keyboard and mouse off of the keyboard tray, which can result in damage to the mouse and keyboard. Yet another problem is that the sliding of the keyboard across the keyboard support can cause squeaking or other irritating sounds which add to the noise level of the office environment.

What is needed in the art is a keyboard assembly that supports a keyboard and mouse without allowing the keyboard and mouse to slide around on the surface of the supporting surface.

SUMMARY OF THE INVENTION

The present invention provides an integral keyboard, tray, mouse pad and wrist rest that attaches and detaches from a work surface with a quick-connect coupler.

The invention comprises, in one form thereof, a keyboard assembly including an integral keyboard device having a keyboard pad support, a keyboard pad, and a wrist rest. An attachment assembly attaches the integral keyboard device to a work surface.

An advantage of the present invention is that the keyboard and mouse pad are in a fixed position, and do not slide around on a keyboard support surface.

Another advantage is that the present invention occupies less space within a work cubical than does a separate keyboard, mouse pad and keyboard tray.

Yet another advantage is that the keyboard cord can be placed in a fixed position, thereby preventing the cord from getting snagged.

A further advantage is a reduction in the number of required components and, thus, a reduction in their associated costs.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
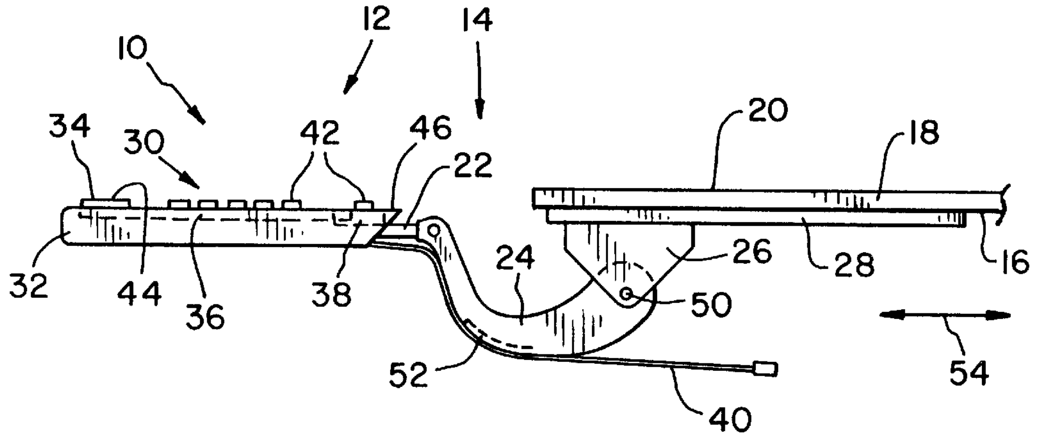
FIG. 1 is a side view of one embodiment of a keyboard assembly of the present invention.

Referring now to the drawings, and more particularly to FIG. 1, there is shown one embodiment of a keyboard assembly 10 of the present invention, including an integral keyboard device 12 and an attachment assembly 14. Attachment assembly 14 is attached to an underside 16 of a desk top 18 having a work surface 20. Attachment assembly 14 includes a quick-connect coupler 22, a mounting arm 24, a pair of mounting brackets 26 and a pair of tracks 28, one of which is shown.

Integral keyboard device 12 includes a keyboard pad 30, a keyboard pad support 32, a wrist rest 34, a mouse pad 36 and an indentation or "mouse house" 38. A communication cord 40 is attached to integral keyboard device 12 and carries data which is dependent upon the actuation of keyboard pad 30 by a user, as is well known. Keyboard pad 30 includes a plurality of rows and columns of keys 42, as is also well known. Keyboard pad support 32 is in the form of a plastic tray that supports keyboard pad 30. Keyboard pad support 32 is integrally formed with pad 30 and with all other components of integral keyboard device 12.

Wrist rest 34 is an elongate pad extending along the length of keyboard pad 30. As best seen in FIG. 1, an upper surface 44 of wrist rest 34 is positioned above an upper surface 46 of keyboard pad support 32. Thus, wrist rest 34 supports a user's wrists or palms at a level above upper surface 46 of keyboard pad support 32. Mouse pad 36 provides a surface on which a computer mouse can be operated.

Indentation 38 provides an area in which a computer mouse can be stored and retained while not in use. Indentation 38 may be in communication with an optional channel 48 in which a cord of a computer mouse may be stored and retained. Alternatively, the cord of the computer mouse may be routed through the body of keyboard pad support 32 and through cord 40.

Quick-connect coupler 22 is a universal attachment that can be quickly and easily snapped onto integral keyboard device 12. Actuation of a button or lever (not shown) releases integral keyboard device 12 from quick-connect coupler 22 and allows device 12 to be detached from coupler 22.

A first end of mounting arm 24 is attached to quick-connect coupler 22. A second end of mounting arm 24 is pivotably attached to mounting brackets 26 at pivot points 50, only one of which is shown. More particularly, mounting arm 24 can pivot clockwise or counterclockwise about pivot points 50 in the plane of the page of FIG. 1. Mounting arm 24 includes a channel 52 in which cord 40 can be retained, thereby preventing snagging of cord 40. Channel 52 can have one open side through which cord 40 can be inserted into channel 52. Alternatively, channel 52 can be in the form of a through channel, i.e., channel 52 can be enclosed throughout 360° and have two open ends through which cord 40 is threaded.

Tracks 28 each slidably retain a respective one of mounting brackets 26. That is, each mounting bracket 26 can be slid within tracks 28 in the directions of double arrow 54 as a result of the user pushing integral keyboard device 12 toward desk top 18 or pulling integral keyboard device 12 away from desk top 18. Tracks 28 are rigidly affixed to underside 16 of desk top 18.

Figure 2:
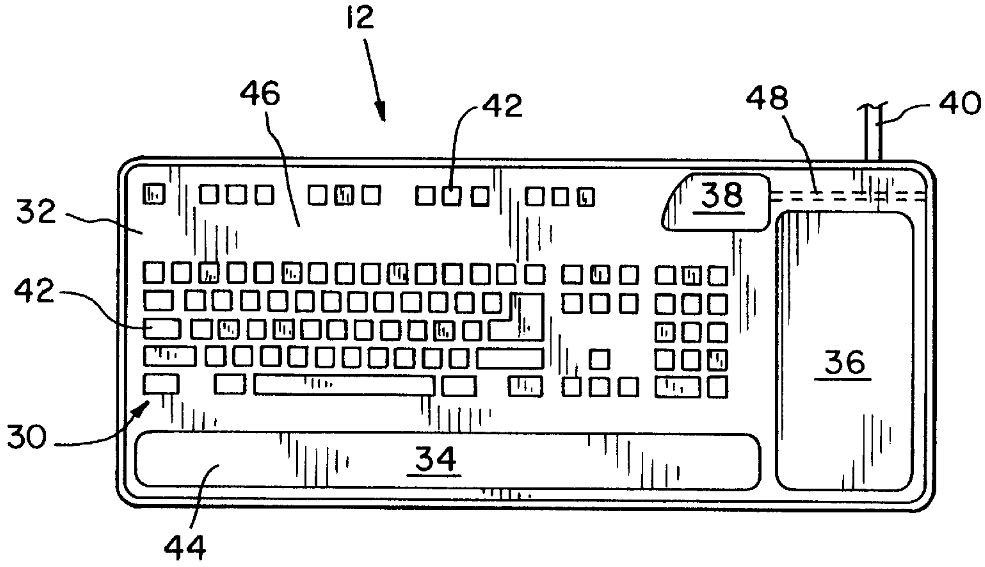
FIG. 2 is a top view of the integral keyboard device of FIG. 1.
Figure 3:
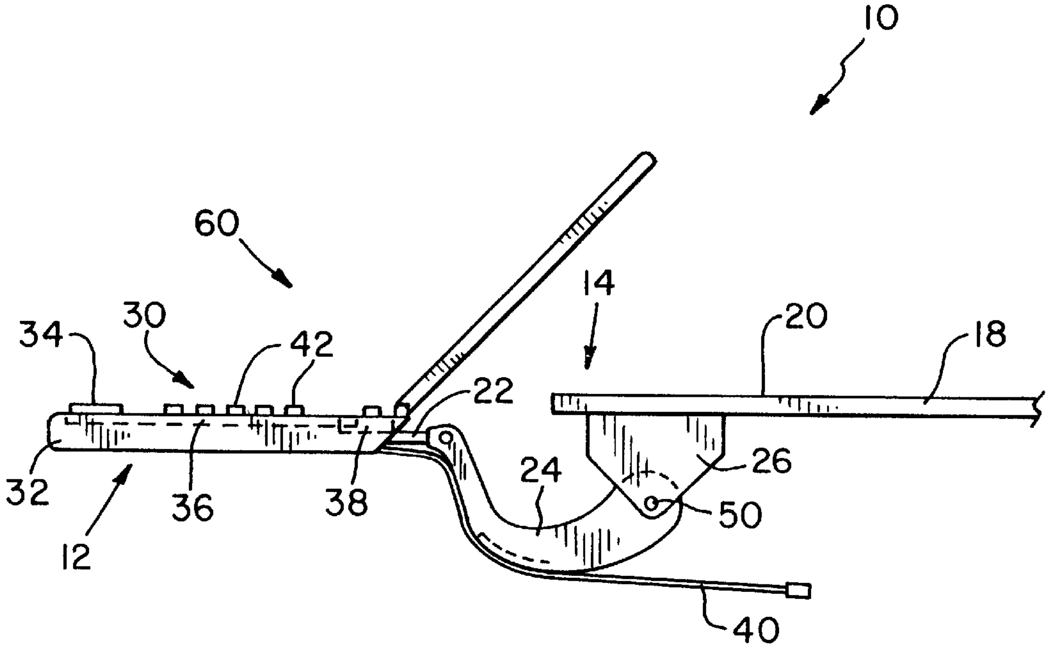
FIG. 3 is a side view similar to FIG. 1, illustrating the keyboard assembly of the present invention for use with a laptop computer.

Integral keyboard device 12 is shown in FIG. 2 as being in the form of a keyboard input device for inputting data into a separate computer. However, it is to be understood that the integral keyboard device of the present invention may also be in the form of a laptop computer 60, as shown in FIG. 3.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A keyboard assembly, comprising:

an integral keyboard device including as integral components there of:

a keyboard pad support including an indentation configured for receiving a computer mouse, and a channel configured for receiving a cord of the mouse;

a keyboard pad; and a wrist rest; and an attachment assembly configured for attaching said integral keyboard device to a work surface.

2. The keyboard assembly of claim 1, wherein said integral keyboard device includes a mouse pad as an integral component thereof.

3. The keyboard assembly of claim 1, wherein said attachment assembly includes a quick-connect coupler configured for being attached to and detached from said integral keyboard device.

4. The keyboard assembly of claim 3, wherein said attachment assembly includes a mounting arm attached to said quick-connect coupler.

5. The keyboard assembly of claim 4, wherein said attachment assembly includes at least one mounting bracket pivotably attached to said mounting arm.

6. The keyboard assembly of claim 5, wherein said attachment assembly includes at least one track slidably attached to said at least one mounting bracket, said at least one track being configured for being attached to an underside of a desk top.

7. The keyboard assembly of claim 1, wherein said wrist rest comprises an elongate pad extending along a length of said keyboard pad.

8. The keyboard assembly of claim 1, wherein said integral keyboard device comprises one of a keyboard input device and a laptop computer.

9. A computer input device, comprising:

an integral keyboard device including a keyboard pad and a keyboard pad support, said keyboard pad support having an indentation configured for receiving a computer mouse and a channel in communication with said indentation and configured for receiving a cord of the mouse; and an attachment assembly attached to said integral keyboard device and configured for being attached to a piece of furniture.

10. The computer input device of claim 9, wherein said attachment assembly includes a quick-connect coupler configured for being attached to and detached from said integral keyboard device.

11. The computer input device of claim 10, further comprising a cord attached to said integral keyboard device, said attachment assembly including a retaining device retaining said cord.

12. The computer input device of claim 11, wherein said attachment assembly includes a mounting arm attached to said quick-connect coupler, said mounting arm including a channel retaining said cord.

13. The computer input device of claim 9, wherein said attachment assembly is configured for enabling pivotal movement of said integral keyboard device relative to the piece of furniture.

14. A computer input device, comprising an integral keyboard device including a keyboard pad, a keyboard pad support and a wrist rest, said keyboard pad support having an indentation configured for receiving a computer mouse and a channel in communication with said indentation and configured for receiving a cord of the mouse.

15. The computer input device of claim 14, wherein said wrist rest comprises an elongate pad extending along a length of said keyboard pad.

16. The computer input device of claim 14, wherein said integral keyboard device includes a mouse pad as an integral component thereof.

17. The computer input device of claim 14, wherein said wrist rest is configured for supporting a wrist of a user.

* * * * *